United States Patent [19]
Arai et al.

[11] Patent Number: 5,231,141
[45] Date of Patent: * Jul. 27, 1993

[54] PROCESS FOR PRODUCING MACROMONOMERS

[75] Inventors: Toshitsugu Arai; Susumu Kawase, both of Sayama, Japan

[73] Assignee: Soken Kagaku Kabushiki Kaisha, Tokyo, Japan

[ * ] Notice: The portion of the term of this patent subsequent to Aug. 28, 2007 has been disclaimed.

[21] Appl. No.: 535,957

[22] Filed: Jun. 11, 1990

Related U.S. Application Data

[62] Division of Ser. No. 52,601, May 19, 1987, Pat. No. 4,952,638.

[30] Foreign Application Priority Data

May 24, 1986 [JP] Japan ................................ 61-119493

[51] Int. Cl.$^5$ .................... C08F 269/00; C08F 283/00
[52] U.S. Cl. .................................. 525/286; 525/262; 525/265
[58] Field of Search ........................ 525/262, 265, 286

[56] References Cited

U.S. PATENT DOCUMENTS 4,748,211  5/1988  Das et al. .............................. 525/286
4,952,638  8/1990  Arai et al. ............................. 525/262

*Primary Examiner*—Ana L. Carrillo
*Assistant Examiner*—W. R. H. Clark
*Attorney, Agent, or Firm*—Koda and Androlia

[57] ABSTRACT

A process for producing a hydrophilic group-containing macromonomer having an ethylenically unsaturated group at the end thereof comprising reacting a hydrophilic group-containing polymer having a carboxyl group at the end thereof, with an ethylenically unsaturated group-containing epoxy compound in the presence of a hydrophilic organic solvent. According to the process of the present invention, there is provided a process for producing a hydrophilic group-containing macromonomer having an ethylenically unsaturated group at the end thereof which has been not known in the prior art.

4 Claims, No Drawings

PROCESS FOR PRODUCING MACROMONOMERS

This is a division of application Ser. No. 052,601, filed May 19, 1987, now U.S. Pat. No. 4,952,638.

BACKGROUND OF THE INVENTION

This invention relates to a process for producing hydrophilic group-containing macromonomers having an ethylenically unsaturated group at the end thereof.

Hydrophilic group-containing macromonomers which are relatively low polymers having a radically polymerizable functional group and having a molecular weight of from about 1,000 to about 100,000 can be copolymerized with ethylenically unsaturated monomers to form graft copolymers. Such graft copolymers have excellent interfacial physical properties and therefore have been utilized as: coating; surface modifiers for resins; primers; adhesives; various binder resins; surfactants; dispersion-stabilizing agents; optical pattern-forming materials in combination with photosetting resins; anti-fogging agents; materials from which contact lenses are produced; and medical polymeric materials.

Prior processes for producing polymers having a radically polymerizable functional group at the end thereof are broadly classified into ionic polymerization processes and radical polymerization processes. Of the above, the ionic polymerization processes have a selectivity for a monomer and a solvent and therefore cannot be applied to the production of a hydrophilic group-containing macromonomer. On the other hand, the radical polymerization processes include a process of making addition polymer containing a terminal functional group reactible in a condensation reaction by polymerising ethylenically unsaturated monomer in the presence of an initiator and a chain transfer agent, each of which contains said functional group (see British Patent Specification No. 1,096,912).

By this process, a functional group which can undergo reaction in the condensation reaction can be introduced into the polymer end. In particular, when the molecular weight of the polymer is high, the process is particularly effective and can positively introduce the functional group. When the thus introduced functional group is reacted with an epoxy compound having a vinyl group, the vinyl group can be introduced into the polymer end.

However, no hydrophilic group-containing macromonomer having an ethylenically unsaturated group at the end thereof and no process for producing the same have been heretofore known. This is because it is thought that the following reaction occurs: even if a relatively low molecular weight hydrophilic group-containing polymer containing hydrophilic groups such as hydroxyl and methylol groups in the polymer and having a functional group such as a carboxyl group at the polymer end is obtained, it is difficult to selectively vinylate the terminal carboxyl group with a vinyl group-containing epoxy compound because a competitive reaction with hydroxyl and methylol groups simultaneously occurs.

Further, in order to lower the molecular weight of the terminal functional group-containing hydrophilic polymer which is a starting material of the process of the present invention, it is necessary to add a large amount of a chain transfer agent to the polymerization reaction system. The chain transfer agent remains after polymerization. If the reaction mixture is used as the starting material as it is, a graft copolymer having a high molecular weight cannot be obtained. If the remaining chain transfer agent is to be removed, an extra purification step will be required.

SUMMARY OF THE INVENTION

A general object of the present invention is to provide a process for producing a useful hydrophilic group-containing macromonomer.

Another object of the present invention is to provide a process for producing a hydrophilic group-containing macromonomer having an ethylenically unsaturated group at the end thereof which has been not known in the prior art.

Still another object of the present invention is to provide a macromonomer capable of copolymerizing with a radically polymerizable vinyl monomer to produce a graft copolymer having a high molecular weight.

A further object of the present invention is to provide a process as stated above wherein a purification step for removing a chain transfer agent is unnecessary.

Further objects and advantages of the present invention will become apparent from the following description.

We have carried out various tests and studies. Surprisingly, we have now found that if a hydrophilic organic solvent is used as a solvent of a reaction system, a terminal carboxyl group is selectively converted into a polymerizable functional group. The present invention has been achieved on the basis of this discovery.

A process for producing a macromonomer of the present invention is a process for producing a hydrophilic group-containing macromonomer having an ethylenically unsaturated group at the end thereof which comprises the step of reacting a hydrophilic group-containing polymer having a carboxyl group at the end thereof, preferably a polymer of molecular weight of from about 1,000 to about 100,000 containing a terminal carboxyl group and having hydroxyl and/or methylol groups, with an ethylenically unsaturated group-containing epoxy compound in the presence of a hydrophilic organic solvent, preferably a hydroxyl group-containing organic solvent.

DETAILED DESCRIPTION OF THE INVENTION

The hydrophilic organic solvents which can be used in the present invention include alcohols such as methanol, ethanol, propyl alcohol, butyl alcohol, cyclohexanol and ethylene glycol; ethers such as dioxane, tetrahydrofuran and tetrahydropyran; and ether-alcohols such as ethylene glycol monoethyl ether (cellosolve) and ethylene glycol monomethyl ether (methyl cellosolve).

Examples of the epoxy compounds having ethylenically unsaturated groups which can be used in the present invention are glycidyl acrylate, 2-methyl glycidyl acrylate, glycidyl methacrylate, 2-methyl glycidyl methacrylate, allyl glycidyl ether, and allyl-2-methyl glycidyl ether.

The hydrophilic group-containing polymer according to the present invention has a carboxyl group at the end thereof. This hydrophilic group-containing polymer is preferably a polymer containing hydroxyl and/or methylol groups. The molecular weight of such a hydrophilic group-containing polymer is relatively low, for example, from 500 to 300,000, preferably from 1,000 to 100,000.

The hydrophilic group-containing polymer can be produced by polymerizing a starting material based on an ethylenically unsaturated monomer containing hydrophilic groups, e.g., hydroxyl and/or methylol groups, in a solvent in the presence of a combination of a carboxyl group-containing chain transfer agent with an initiator or in the presence of an initiator containing a carboxyl group.

The initiators which can be used in the present process include 4,4'-azobis-4-cyanovaleric acid, 2,2'-azobis-2-amidinopropane hydrochloride, potassium peroxide, ammonium peroxide, azobisisobutyronitrile, and benzoyl peroxide.

The monomers, e.g., ethylenically unsaturated monomers containing hydrophilic groups include acrylamide, methacrylamide, N-methylolacrylamide, N-methylol methacrylate, 2-methoxyethyl acrylate, 2-methoxyethyl methacrylate, diacetonacrylamide, hydroxyethyl acrylate, hydroxypropyl acrylate, hydroxybutyl acrylate, hydroxyethyl methacrylate, hydroxypropyl methacrylate, hydroxybutyl methacrylate; acrylic esters of polyhydric alcohols; and methacrylic esters of polyhydric alcohols. In addition, the copolymerizable monomers include acrylamide and its derivatives, methacrylamide and its derivatives, N-methylolacrylamide derivatives, N-methylolmethacrylamide derivatives, ethyl acrylate carbitol, methyl triglycol acrylate, 2-hydroxyethylacryloyl phosphate, and butoxyethyl acrylate.

In carrying out radical polymerization of the starting material comprising, as a principal component, the ethylenically unsaturated monomer containing hydrophilic groups, e.g., hydroxyl and/or methylol groups in the presence of the carboxyl group-containing initiator in water and/or the organic solvent, the use of the initiator in an amount of from 5 to 20 gm·moles per 100 gm·moles of the monomer described above can positively introduce the carboxyl group into one end of the polymer. While the polymerization temperature is ordinarily at least 80° C., it can be varied according to the kind of the initiators. If the amount of the initiator described above is less than 5 gm·moles per 100 gm·moles of the monomer, the efficiency of the initiator will become poor, and a large amount of a homopolymer containing no carboxyl group will be formed. If the amount of the initiator is more than 20 gm·moles per 100 gm·moles of the monomer, a two molecule coupling reaction or the like can occur, and some polymers containing carboxyl groups at both ends thereof tend to be formed.

The process of the present invention is characterized in that a hydrophilic group-containing polymer containing a terminal carboxyl group is reacted with an ethylenically unsaturated group-containing epoxy compound in the presence of a hydrophilic organic solvent. This reaction can be ordinarily carried out at a temperature of from 65° to 180° C., preferably from 90° to 140° C. If the reaction temperature is less than 65° C., the reaction will be time-consuming, and its efficiency will be inferior. If the reaction temperature is more than 180° C., the competitive reaction between the OH group and the epoxy group will occur, and the reaction between methylol groups and the reaction between methylol group and OH group will occur.

It is believed that, during the steps of the present invention, the hydrophilic organic solvents, e.g., hydroxyl group-containing organic solvents have a strong affinity for the hydroxyl and/or methylol groups in the hydrophilic group-containing polymer, and the hydroxyl group-containing organic solvents surround the vicinity of the hydrophilic functional group thereof. Accordingly, in the case of the hydrophilic group-containing polymer having the carboxyl group at the end thereof, the epoxy compound and the terminal carboxyl group are selectively reacted in the hydroxyl group-containing organic solvent. Thus, the radically polymerizable functional group can be readily introduced into the polymer end.

EXAMPLES

The present invention will now be illustrated more fully by the following Examples and Comparative Examples. All parts used herein are by weight unless etherwise indicated.

EXAMPLE 1

A mixture of 50 parts of N-methylolacrylamide, 50 parts of 2-hydroxyethyl acrylate, 10 parts of 4,4'-azobis-4-cyanovaleric acid, 3.4 parts of 28% aqueous ammonia, and 200 parts of water was added dropwise to 300 parts of water at 95° C. under $N_2$ for 5 hours. The reaction was continued for an additional 4 hours, and thereafter 500 parts of ethylene glycol monoethyl ether was added. Water was distilled off until the refluxing temperature reached 130°~140° C. To this solution were addd 10.1 parts of glycidyl methacrylate, 0.01 part of hydroquinone, and 0.05 part of N,N-dimethyldodecylamine. The reaction was carried out for 4 hours at a temperature of 130° C. to obtain a solution of a vinyl-terminated macromonomer in 2-ethoxyethanol (about 25% of nonvolatile matter).

APPLICATION EXAMPLE

A mixture of 120 parts of the 25% solution of macromonomer in 2-ethoxyethanol obtained in Example 1 (30 parts of macromonomer solids content), 70 parts of methyl methacrylate, 40 parts of toluene, 20 parts of ethylene glycol monomethyl ether, and 0.3 part of azobisisobutyronitrile was subjected to a polymerization reaction for 12 hours under $N_2$ at a temperature of 70° C. The resulting composition was a homogeneous clear solution wherein the nonvolatile matter was 40.5%, the $\overline{M}w$ was 75,000 and the $\overline{M}n$ was 30,000.

EXAMPLE 2

A mixture of 60 parts of N-methylolacrylamide, 30 parts of diacetonacrylamide, 10 parts of acrylamide, 15 parts of 4,4'-azobis-4-cyanovaleric acid, 4.3 parts of 28% aqueous ammonia and 300 parts of water was added dropwise to 400 parts of water at 85° C. for 6 hours under $N_2$. The reaction was continued for an additional 4 hours, and thereafter 500 parts of ethylene glycol monomethyl ether and 200 parts of diethylene glycol were added. Water was distilled off until the refluxing temperature reached 130°~140° C. To this solution were added 15.2 parts of glycidyl methacrylate, 0.015 part of hydroquinone, and 0.15 part of N,N-dimethyldodecylamine. The reaction was carried out for 6 hours at a temperature of 130° C. to obtain a solution of a vinyl-terminated macromonomer in 2-methoxyethanol/diethylene glycol (about 20% of nonvolatile matter).

EXAMPLE 3

A mixture of 80 parts of 2-hydroxyethyl methacrylate, 20 parts of 2-methoxyethyl methacrylate, 10 parts of 4,4'-azobis-4-cyanovaleric acid, 80 parts of methanol, and 120 parts of ethylene glycol monomethyl ether was added dropwise to a mixture of 40 parts of methanol and 260 parts of 2-diethylene glycol at 80° C. for 5 hours under $N_2$. The reaction was continued for an additional 4 hours, and thereafter the solvent was distilled off until the refluxing temperature reached 140°~150° C. To this solution were added 10.1 parts of glycidyl methacrylate, 0.015 part of hydroquinone, and 0.15 part of N,N-dimethyldodecylamine. The reaction was carried out for 4 hours at a temperature of 140° C. to obtain a solution of a vinyl-terminated macromonomer in ethylene glycol monomethyl ether/diethylene glycol (about 20% of nonvolatile matter).

COMPARATIVE EXAMPLE 1

To the aqueous solution of the carboxyl-terminated oligomer synthesized as in Example 1 were added 500 parts of DMF in place of ethylene glycol monoethyl ether. Water was distilled off until the refluxing temperature reached 130°~140° C. To this solution were added 10.1 parts of glycidyl methacrylate, 0.01 part of hydroquinone and 0.05 part of N,N-dimethyldodecylamine. As the reaction mixture was heated to a temperature of 130° C., it gelled after 2 hours. It is believed that gelation is due to the intramolecular crosslinking of the methylol groups of N-methylolacrylamide.

COMPARATIVE EXAMPLE 2

The polymerization and vinylation as described in Example 1 were carried out to obtain a 25% solution of a vinyl-terminated macromonomer in ethylene glycol monoethyl ether except that 10 parts of 4,4'-azobis-4-cyanovaleric acid were replaced by 9.7 parts of 2,2'-azobis-2-amidinopropane hydrochloride and 6.6 parts of thioglycollic acid. The same polymerization reaction as that described in the Application Example was carried out using the solution. The average molecular weights of the resulting composition were as follows: an $\overline{M}w$ of 10,000 and an $\overline{M}n$ of 5,000. It is believed that such molecular weights are due to the influence of thioglycollic acid remaining in the system.

COMPARATIVE EXAMPLE 3

The polymerization and vinylation as described in Example 1 were carried out to obtain a 25% solution of a vinyl terminated macromonomer in ethylene glycol monoethyl ether except that 10 parts of 4,4'-azobis-4-cyanovaleric acid were replaced by 2.0 parts of 4,4'-azobis-4-cyanovaleric acid and 6.0 parts of thioglycollic acid. The same polymerization reaction as that described in Application Example was carried out using the solution. Gelation occurred at 1.5 hour after the reaction was initiated. It is believed that the gelation is due to the presence of divinyl units in the macromonomer.

What is claimed is:

1. A process for producing hydrophilic group containing macromonomers having an ethylenically unsaturated group at the terminal and thereof which comprises the step of reacting a hydrophilic group-containing polymer which contains hydroxyl groups wherein at least one of the hydroxyl groups is an N-methylol group, said polymer having a carboxyl group at the terminal end thereof, with an ethylenically unsaturated group-containing epoxy compound in the presence of a hydrophilic organic solvent having a hydroxyl group, said epoxy compound being selected from the group consisting of glycidyl acrylate, 2-methylglycidyl acrylate, glycidyl methacrylate, and 2-methylglycidyl methacrylate.

2. The process according to claim 1, wherein the hydrophilic group-containing polymer has an average molecular weight of from 1,000 to 100,000.

3. The process according to claim 1, wherein the hydrophilic group-containing polymer is produced by polymerizing an ethylenically unsaturated monomer or monomers containing hydroxyl groups wherein at least one of the hydroxyl groups is an N-methylol group in the presence of radical polymerization initiator containing a carboxyl group and in a hydrophilic organic solvent.

4. The process according to claim 3, wherein the initiator is present in the polymerization step in an amount of from 5 to 20 gm moles per 100 gm moles of the starting monomer.

* * * * *